US006231096B1

United States Patent
Bollmann et al.

(10) Patent No.: US 6,231,096 B1
(45) Date of Patent: May 15, 2001

(54) CARGO SPACE COVERING FOR A CARGO SPACE OF A MOTOR VEHICLE

(75) Inventors: Juergen Bollmann, Schoernberg; Ferdinand Greiner, Wildberg; Hans-Guent Moeller, Aidlingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/415,059

(22) Filed: Oct. 12, 1999

(30) Foreign Application Priority Data

Oct. 10, 1998 (DE) .............................................. 198 46 823

(51) Int. Cl.[7] ........................................................ B60R 5/04
(52) U.S. Cl. .................................... 296/37.16; 296/146.8; 296/100.06
(58) Field of Search .................................. 296/37.5, 37.8, 296/37.16, 76, 24.1, 100.06, 106, 146.8

(56) References Cited

U.S. PATENT DOCUMENTS

| 4,127,301 | 11/1978 | Syrowik . |
| 4,728,141 | * 3/1988 | Montozawa et al. ............. 296/37.16 |
| 5,209,543 | 5/1993 | Harkins, Jr. . |

FOREIGN PATENT DOCUMENTS

| 2921813 | 10/1986 | (DE) . |
| 4014871A1 | * 11/1990 | (DE) . |
| 19526887A1 | 1/1997 | (DE) . |
| 0066514 | 2/1986 | (EP) . |
| 2295992 | * 6/1996 | (GB) . |
| 2 334 931 | 8/1999 | (GB) . |
| 60-182257 | 12/1985 | (JP) . |
| 2-93153 | 7/1990 | (JP) . |

* cited by examiner

*Primary Examiner*—D. Glenn Dayoan
*Assistant Examiner*—Patricia Engle
(74) *Attorney, Agent, or Firm*—Evenson, McKeown, Edwards & Lenahan, P.L.L.C.

(57) ABSTRACT

A cargo space covering for a cargo space of a motor vehicle, particularly a station wagon, has at least one inherently rigid covering element which, in an approximately horizontal covering position approximately in parallel to the cargo space floor, separates the cargo space from the vehicle occupant compartment and can be swivelled upward out of the covering position about a swivelling axis into an unloading position. The swivelling axis of the covering element extends approximately in the longitudinal direction of the vehicle. Two covering elements are provided which are pivotable about respective swivelling axes of hinges extending along lateral sides of the cargo space. The hinges are releasable and the covering elements are configured to form a portable suitcase when removed from the vehicle.

20 Claims, 2 Drawing Sheets

CARGO SPACE COVERING FOR A CARGO SPACE OF A MOTOR VEHICLE

BACKGROUND AND SUMMARY OF THE INVENTION

This application claims the priority of German application 198 46 823.7-21, filed in Germany n Oct. 10, 1998, the disclosure of which is expressly incorporated by reference herein.

The invention relates to a cargo space covering for a cargo space of a motor vehicle, particularly a station wagon. Preferred embodiments of the invention relate to a cargo space covering for the cargo space of a motor vehicle station wagon, having at least one inherently rigid covering element which, for forming a luggage tray, is arranged in an adjoining manner behind a backrest and approximately at the level of a board edge, which covering element, in its approximately horizontal covering position approximately in parallel to the cargo space floor, separates the cargo space from the vehicle occupant compartment and can be swivelled upward from the covering position about a swivelling axis into an unloading position.

Such a cargo space covering for a cargo space of a motor vehicle is known from European Patent Document EP 0 066 514 B1 and relates to a foldable luggage tray for the cargo space of a motor vehicle. In an approximately horizontal covering position, this luggage tray separates the cargo space from the occupant compartment and comprises two mutually linked covering parts which are connected in one piece with one another by a thin bendable part which forms a hinge. As the result, at least one covering element can be swivelled from the covering position about a swivelling axis, which extends approximately in the transverse direction of the vehicle and is formed by the hinge, upwards into an unloading position. The swivelling of the covering element takes place by means of a connection member, which connects the covering element with the tail gate, whereby, when the tail gate is opened into an upward direction, the covering element is also swivelled from the covering position upward into the loading and unloading position.

However, the covering parts of this luggage tray are arranged such above the cargo space and can be swivelled such that it is hardly possible to load the cargo space particularly with larger goods.

German Patent Document DE 29 21 813 A1 (corresponding to U.S. Pat. No. 4,351,555), which relates to a folding covering for the storage space of a motor vehicle, shows another cargo space covering of the above-mentioned type. This folding covering comprises two covering plates which are hinged to one another and which, in an approximately horizontal covering position, separate the cargo space from the occupant compartment. The rearward covering plate of the two covering plates can be swivelled upward into an unloading position about a swivelling axis extending approximately in the transverse direction of the vehicle. On the tail gate, which can also be swivelled upward, a connection member is provided by means of which, when the tail gate is opened up, the rearward covering plate is moved upward into its unloading position. Also in the case of the covering plates illustrated here, the loading of the cargo space with fairly large, bulky goods is relatively cumbersome.

Furthermore, from U.S. Pat. No. 5,209,543, an arrangement is known for opening the roof of a pick-up truck whose cargo space is surrounded by a box body in the area of the platform. The roof of the box body is essentially formed by two door-type covering parts which are separated from one another by a separating fold extending in the vehicle center and in the longitudinal direction of the vehicle and whose respective swivelling axis extends on the exterior side in the longitudinal direction of the vehicle. For loading the platform with bulky goods, the two covering parts can be swivelled by means of the above-mentioned arrangement into an opened position.

It is an object of the invention to provide a cargo covering for a cargo space of a motor vehicle of the type referred to above which can easily be handled for loading the cargo space with bulky goods.

According to the invention, this object is achieved by a cargo space covering for a cargo space of a motor vehicle wherein the swivelling axis extends approximately in the longitudinal direction of the vehicle, and wherein the covering element can be swivelled in the direction of an assigned vehicle side wall.

In the case of a cargo space covering according to the invention, the swivelling axis, about which the covering element can be swivelled upward from its covering position into its loading and unloading position, extends approximately in the longitudinal direction of the vehicle, so that the covering element, which can be swivelled longitudinally to the driving direction, can be swivelled upward into the loading and unloading position, until, depending on the dimensioning in the area of the vehicle ceiling or in the area of a C-column or a possible D-column, it takes up its maximally possible and thus steepest swivelling possibility.

Thus, during the loading or unloading, on the side of the covering element facing away from the swivelling axis, an area of the cargo space is available which, with respect to its height, projects to the vehicle ceiling and, with respect to its width, extends between the rearward loading edge and the side of the rear backrest facing the cargo space. In this very large space, bulky goods can be loaded or removed in an advantageous manner, particularly in the longitudinal direction of the vehicle, in which case the whole height of the vehicle is available also on the side of the rear backrest facing the cargo space.

Advantageous embodiments of the cargo space covering for a cargo space of a motor with expedient further embodiments of the invention are described here and in the claims.

According to a further feature of preferred embodiments of the present invention, it was found to be particularly advantageous for the swivelling axis of the covering element to extend in the area of the cargo space in the proximity of the exterior side of the vehicle, whereby, on the side facing away from the swivelling axis, a particularly wide area is obtained for loading the cargo space with bulky goods.

According to a further feature of preferred embodiments of the present invention, special advantages are provided by a covering element which is formed of two covering parts. In this case, the two swivelling axes of the covering parts may be arranged side-by-side and preferably in parallel to one another. By dividing the covering element, two covering parts are obtained which can be moved into a particularly steep loading and unloading position and, as a result, create a large loading space for the goods to be transported.

With respect to the arrangement of two covering parts, it was also found to be advantageous that the two swivelling axes each extend in the proximity of the exterior side of the vehicle, whereby the covering parts can be swivelled to the C-column and possibly the D-column and again provide a large loading space for the goods to be transported.

According to a further feature of preferred embodiments of the present invention, if the covering element or the covering parts are arranged on the covering sections by means of releasable hinges, either one covering part or both covering parts can be removed as required.

In addition, the swivelling of the covering element and of the covering parts can take place by means of a connection member which is particularly easy to produce, requires little maintenance and is connected with the tail gate, or, in a further development of the invention, by means of spring elements, as the result of which the covering parts can be swivelled in a particularly comfortable manner, for example, separately.

According to a further feature of preferred embodiments of the present invention, the two covering parts removed from the vehicle have a shell-shaped construction and can be joined to form a suitcase, which provides an additional usage possibility for the covering parts.

Finally, according to a further feature of preferred embodiments of the present invention, it was found to be advantageous that the hinge halves on the covering parts provided for the arrangement on the vehicle are constructed such that they simultaneously form the hinges of the suitcase and the covering parts can therefore be available for several usage possibilities in a particularly fast and simple manner.

Other objects, advantages and novel features of the present invention will become apparent from the following detailed description of the invention when considered in conjunction with the accompanying drawings.

DETAILED DESCRIPTION OF THE INVENTION

Figure 1:
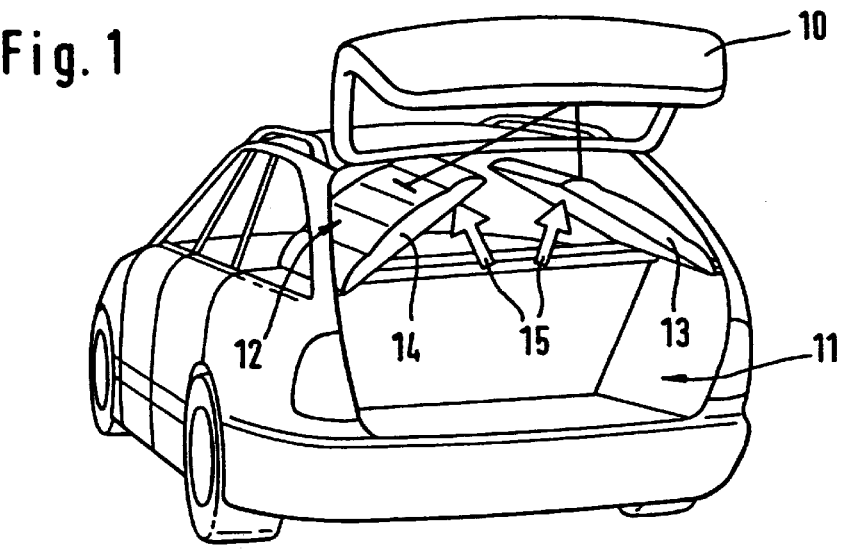
FIG. 1 is a perspective view of a cargo space of a motor vehicle with the cargo space covering in its loading and unloading position, constructed according to a preferred embodiment of the invention.

FIG. 1 is a perspective view of a motor vehicle with an opened tail gate 10 whose cargo space 11 has a cargo space covering which is constructed as an inherently rigid covering element 12. The covering element 12 comprises two covering parts 13, 14 which—as indicated by the arrows 15—are arranged to be swivellable in their loading and unloading position upward in the direction of the rearward side windows and of the C and D columns of the vehicle.

Figure 2:
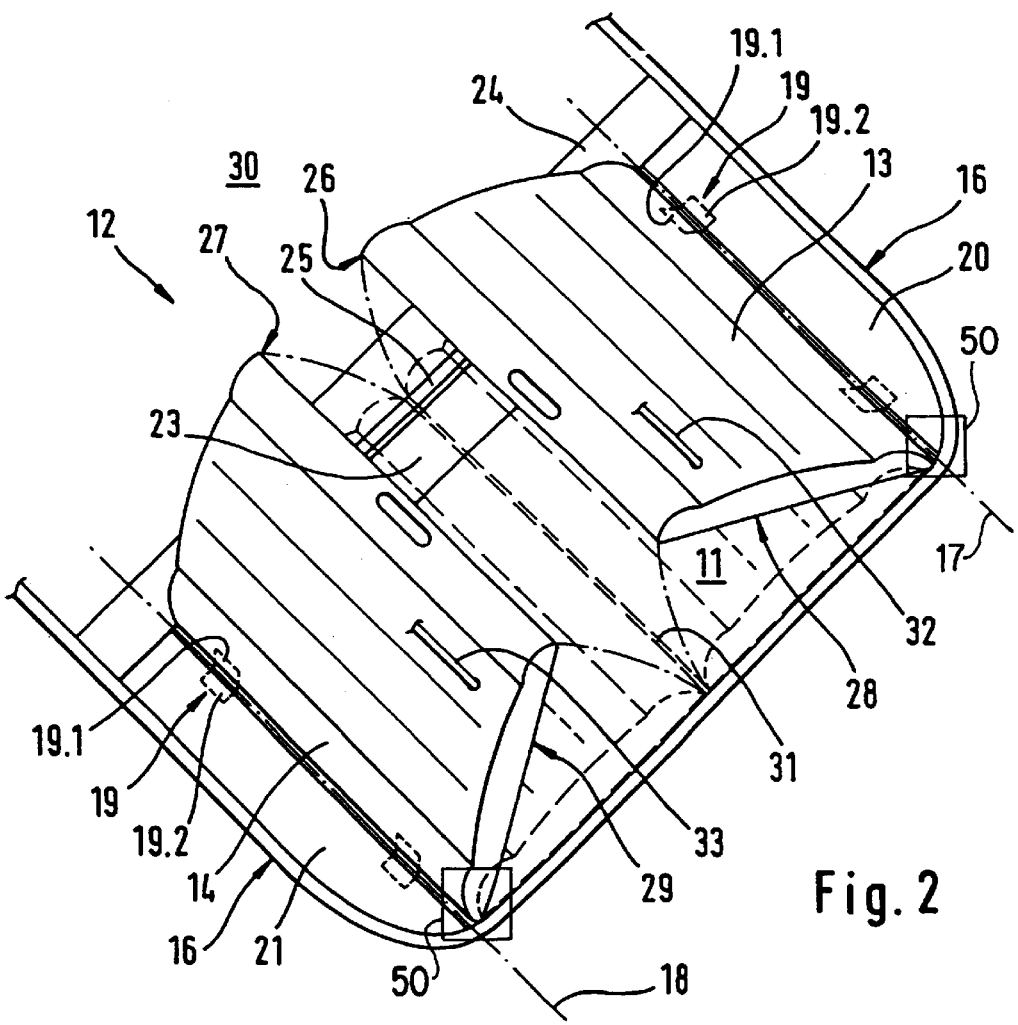
FIG. 2 is a cutout-type perspective view of the cargo space covering according to FIG. 1.

FIG. 2 is a cutout-type perspective view of the covering element 12 according to FIG. 1 whose covering parts 13, 14 are swivelled upward into the loading and unloading position about in each case one swivelling axis 17, 18 which extends in the area of the assigned exterior side 16 of the vehicle horizontally approximately in the longitudinal direction of the vehicle. In order to permit this swivelling movement, the covering parts 13, 14 are arranged by means of releasable hinges 19, with hinge halves 19.1 and 19.2, on a respectively assigned fixed covering section 20, 21 fastened on the vehicle body in the area of the exterior side 16 of the vehicle. Here, the covering parts 13, 14 have a shell-shaped construction and are produced of a plastic material. It is also contemplated according to preferred embodiments of the invention to manufacture the covering parts 13, 14 of a composite material or of a metal, particularly a light metal. As substantially illustrated in FIGS. 1 and 2, on the top side of the two covering parts 13, 14, one connection member 32, 33 respectively is arranged which is connected with the tail gate 10 and by means of which the covering parts 13, 14 are swivelled upward into their loading position when the tail gate 10 is opened up.

On a rearward side 23 of a rear backrest 24 facing the cargo space 11, a support strip 25 is fastened which extends between the two swivelling axes 17, 18 in the transverse direction of the vehicle and approximately horizontally. In their lower, approximately horizontal covering position which is indicated by a broken line, the two covering parts 13, 14 rest on this support strip 25 by means of a respective forward face end section 26, 27 along the whole length of the support strip 25. In addition, a second strip, which is not shown, may be fastened on the side of the tail gate 10 facing the cargo space 11, which second strip extends on a joint horizontal plane with the support strip 25 as well as in the transverse direction of the vehicle and thus forms another support possibility for a respective rearward face end section 28, 29 of the two covering parts 13, 14.

With respect to their contour, the covering parts 13, 14 are adapted to the covering sections 20, 21 and to the support strip 25 and the strip on the tail gate which is not shown, so that they essentially completely separate the cargo space from the occupant compartment 30. In order to separate the occupant compartment 30 from the cargo space in a manner which is tight with respect to dust and/or odors, seals may be provided in the area between the covering parts 13, 14 and the strips 25 or the covering sections 20, 21.

Along a separating fold 31, which extends in the longitudinal direction of the vehicle and approximately in the center of the vehicle, the two covering parts 13, 14 are separated from one another and adapted to one another in their horizontal covering position outlined by a broken line. A seal between the two covering parts 13, 14 for sealing off dust and odors can also be provided along this separating fold 31.

Figure 3:
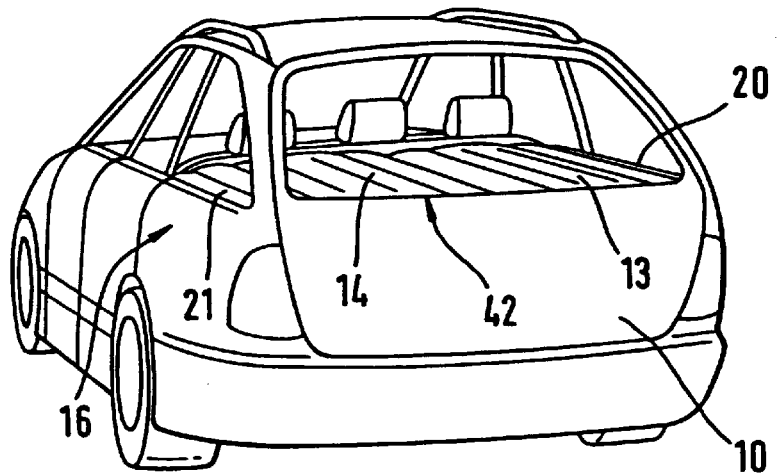
FIG. 3 is a another perspective view of the vehicle with a closed tail gate and of the cargo space covering of the invention according to FIG. 1 in its covering position.

In another perspective view, FIG. 3 illustrates the covering element 12 according to FIG. 1 in its covering position, the covering parts 13, 14 and the covering sections 20, 21 forming an essentially approximately horizontal plane which extends at the level of a board edge 42 (preferably located at a level of the vehicle "beltline" at a level of the bottom of the vehicle side and rear door windows). It would also be conceivable for the covering parts 13, 14 and the covering sections 20, 21 to extend in a sloped manner above the cargo space 10 in the longitudinal or transverse direction of the vehicle.

Figure 4:
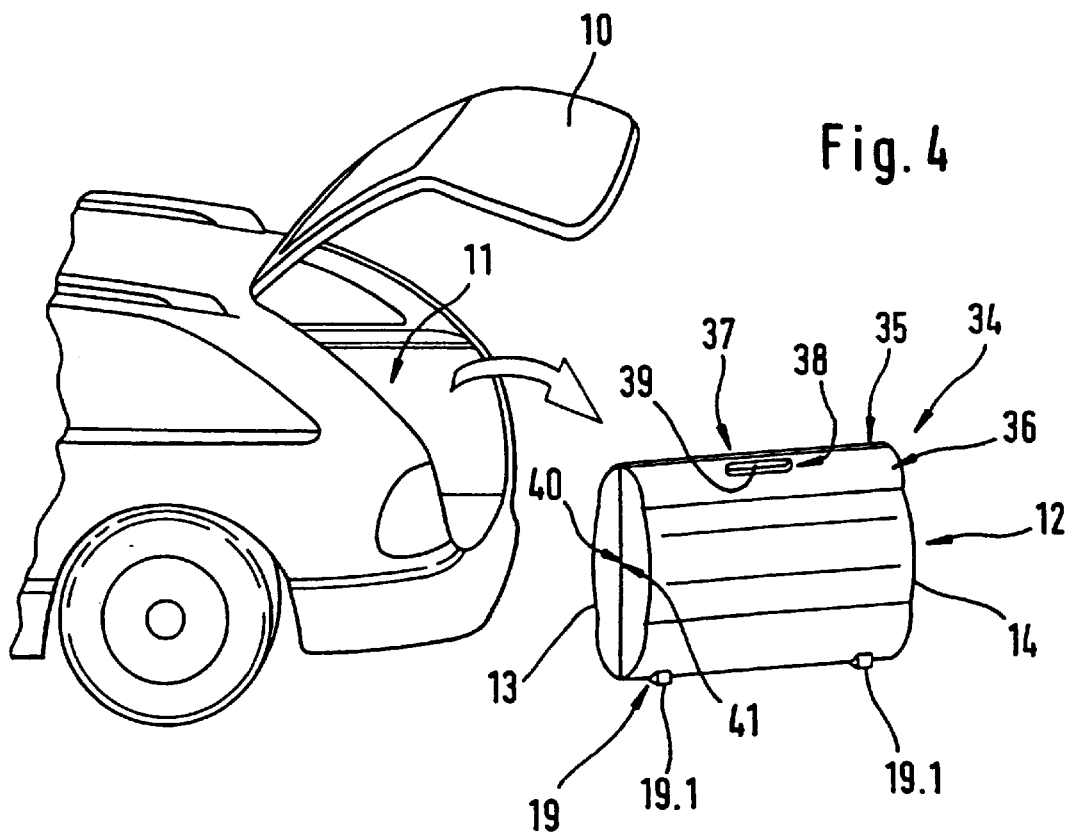
FIG. 4 is a perspective lateral view of the vehicle with the cargo space covering of the invention according to FIG. 1, whose two covering parts are removed from the vehicle and are joined to form a suitcase.

FIG. 4 is a perspective lateral view of the vehicle with the covering element 12 according to FIG. 1, in which case the two shell-shaped covering parts 13, 14 are removed from vehicle at the releasable hinges 19 and are joined to form a suitcase 34. In this case, the covering parts 13, 14 are adapted to one another on their mutually facing abutting ends 40, 41 and are constructed such that a suitcase 34 is created which closes in a flush manner and has a carrying possibility. As illustrated in FIG. 2, the releasable hinges 19 are constructed in two parts so that the covering parts 13, 14, with the first hinge halves 19.1 can be swivellably disposed on assigned second hinge halves 19.2 on the covering sections 21, 22 in order to permit the swivelling movement inside the vehicle from the covering position into the loading and unloading position. In addition, the hinge halves 19.1 are constructed such and are arranged such on the covering parts 13, 14 that they jointly form the hinges 19 of the suitcase 14. On the sides 35, 36 facing away from the hinges 19, the covering parts 13, 14 are penetrated by gripping holes 37, 38 which, when the covering parts 13, 14 are joined, form a grip 39 of the suitcase 34.

It is considered to be included in the scope of the invention that the covering parts may have a flat contour.

Also, instead of being swivelled upward into the loading and unloading position by means of connection members 32, 33, the covering parts 13, 14 can be swivelled by means of one spring system (schematically illustrated at 50 in FIG. 2) respectively preferably arranged in the area of the swivelling axes 17, 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cargo space covering for the cargo space of a motor vehicle station wagon, having at least one inherently rigid covering element which, for forming a luggage tray, is arranged in an adjoining manner behind a backrest and approximately at the level of a board edge, which covering element, in its approximately horizontal covering position approximately in parallel to the cargo space floor, separates the cargo space from the vehicle occupant compartment and is swivellable upward from the covering position about a swivelling axis into an unloading position,
    wherein the swivelling axis extends approximately in the longitudinal direction of the vehicle and adjacent a side wall of the vehicle, and
    wherein the covering element is swivellable in a direction toward a plane of the vehicle side wall.

2. Cargo space covering according to claim 1, wherein the swivelling axis extends adjacent an exterior side of the vehicle.

3. Cargo space covering according to claim 1, wherein the covering element comprises two covering parts separated from one another along a separating fold, and a swivelling axis corresponds to each covering part and each swivelling axis extends approximately in the longitudinal direction of the vehicle.

4. Cargo space covering according to claim 3, wherein the separating fold extends approximately in a vehicle center and approximately in the longitudinal direction of the vehicle.

5. Cargo space covering according to claim 3, wherein the two swivelling axes each extend adjacent to a respective exterior side of the vehicle.

6. Cargo space covering according to claim 3, wherein the covering parts can be swivelled by means of releasable hinges about the swivelling axes.

7. Cargo space covering according to claim 3, wherein the covering parts are connected by one connection member respectively with the tail gate and, when the tail gate is opened, can be swivelled upward into the unloading position.

8. Cargo space covering according to claim 3, wherein the covering parts can be swivelled upward into the loading and unloading position by one spring system respectively which is preferably arranged in the area of the swivelling axes.

9. Cargo space covering according to claim 3, wherein the covering parts have a shell-shaped construction and are adapted to one another such that they can be joined to form a portable suitcase.

10. Cargo space covering according to claim 6, wherein the covering parts have a shell-shaped construction and are adapted to one another such that they can be joined to form a portable suitcase.

11. Cargo space covering according to claim 10, wherein the hinge halves assigned to the covering parts are constructed and arranged on the covering parts such that they form the hinges of the suitcase.

12. Cargo space covering assembly for a station wagon of the type having a vehicle occupant compartment with a seat with a rearwardly facing seat back and a cargo space disposed behind the seat back, said cargo space covering assembly comprising;
    a first movable rigid cover member which is movable between a cargo space covering position substantially parallel to and spaced from a floor of the cargo space to separate the cargo space and vehicle occupant compartment, and a cargo space uncovering position, and
    a first hinge operable in use to pivotally support the first movable cover member for movement between the cargo space covering position and uncovering position,
    wherein said first hinge has a hinge axis extending longitudinally of the station wagon adjacent a side wall and is operable to facilitate pivoting movement of the first movable cover member, and a side of said first movable cover member opposite the hinge moving closer to a plane of the side wall of said station wagon when moved to the cargo space uncovering position to facilitate loading and unloading of the cargo space.

13. Cargo space covering assembly according to claim 12, wherein said first movable cover member is disposed in a horizontal plane at a level of bottom edges of windows of the station wagon when in the cargo space covering position, thereby forming a luggage tray behind the back rest.

14. Cargo space covering assembly according to claim 12, comprising a second movable rigid cover member arranged symmetrically with respect to said first movable cover member, said first and second movable cover member together forming a substantially planar cover for the cargo space when in respective cargo space covering positions, and
    wherein each of said first and second movable cover members are supported at respective releasable hinges having hinge pivot axes extending longitudinally of the vehicle.

15. Cargo space covering assembly according to claim 14, comprising respective first and second fixed side cover members fixed to side walls of the cargo space and extending laterally inwardly over a part of the cargo space, and
    wherein said releasable hinges are releasably connected with respective ones of said first and second fixed side cover members.

16. Cargo space covering assembly according to claim 15, wherein said first and second movable cover members have a shell shaped construction and are configured to fit together to form a portable suitcase.

17. Cargo space covering assembly to claim 16, wherein the hinges are releasable hinges which also form a hinged connection for the movable cover members when connected to form the portable suitcase.

18. Cargo space covering assembly for a station wagon of the type having a vehicle occupant compartment with a seat with a rearwardly facing seat back and a cargo space disposed behind the seat back, said cargo space covering assembly comprising:
- a first movable rigid cover member which is movable between a cargo space covering position substantially parallel to and spaced from a floor of the cargo space to separate the cargo space and vehicle occupant compartment, and a cargo space uncovering position; and
- a second movable rigid cover member arranged symmetrically with respect to said first movable cover member, said first and second movable cover member together forming a substantially planar cover for the cargo space when in respective cargo space covering positions;
- wherein each of said first and second movable cover members are supported at respective releasable hinges having hinge pivot axes extending longitudinally of the vehicle, the releasable hinges operable in use to pivotally support the first and second movable cover members for movement between the cargo space covering position and uncovering position;
- wherein the releasable hinges each have a hinge axis extending longitudinally of the station wagon and are operable to facilitate pivoting movement of the first and second movable cover members, and a side of said first movable cover member opposite the respective hinge moving closer to a side wall of said station wagon when moved to the cargo space uncovering position to facilitate loading and unloading of the cargo space; and
- first and second fixed side cover members fixed to respective side walls of the cargo space and extending laterally inwardly over a part of the cargo space;
- wherein said releasable hinges are releasably connected with respective ones of said first and second fixed side cover members.

19. Cargo space covering assembly according to claim 18, wherein said first and second movable cover members have a shell shaped construction and are configured to fit together to form a portable suitcase.

20. Cargo space covering assembly to claim 19, wherein the hinges are releasable hinges which also form a hinged connection for the movable cover members when connected to form the portable suitcase.

* * * * *